United States Patent [19]

Foster et al.

[11] 3,726,923
[45] Apr. 10, 1973

[54] PROCESS FOR THE MANUFACTURE OF N,N-DICHLOROALKYL-2,6-DINITRO-4-ALKYL ANILINE

[75] Inventors: Harold M. Foster; Thomas C. Rees; Floyd G. Spence, all of Park Forest, Ill.

[73] Assignee: The Sherwin-Williams Company, Cleveland, Ohio

[22] Filed: Mar. 16, 1970

[21] Appl. No.: 20,124

[52] U.S. Cl. ................260/577, 71/121, 260/573, 260/574, 260/575, 260/576, 260/578, 260/688, 71/571
[51] Int. Cl. ............................................C07c 87/60
[58] Field of Search.................260/571, 573, 574, 260/575, 576, 577, 578, 688

[56] References Cited

UNITED STATES PATENTS

| | | | |
|---|---|---|---|
| 2,435,314 | 2/1948 | Kokatnur | 260/688 X |
| 2,739,174 | 3/1956 | Ross | 260/688 X |
| 3,086,062 | 4/1963 | Oltay et al. | 260/645 |
| 3,062,887 | 11/1962 | Levering et al. | 260/577 X |

OTHER PUBLICATIONS

Groggins, "Unit Processes in Organic Synthesis," McGraw-Hill Book Co., Inc.: New York, 1958, pages 61, 70–72.

Primary Examiner—Lewis Gotts
Assistant Examiner—C. F. Warren
Attorney—McNenny, Farrington, Pearne and Gordon

[57] ABSTRACT

A process for the manufacture of N,N-dihaloalkyl-2,6-dinitro-4-substituted anilines from a 4-substituted aniline. Specifically, a process for the direct orthodinitration of N,N-di(2-haloalkyl)-4-substituted tertiary aromatic amines in the presence of at least a twofold excess over theoretical of concentrated nitric acid and a catalytic amount of nitrous acid, or a derivative thereof capable of generating nitrite ions in aqueous acid, optionally in a muliphase liquid system having an aqueous phase and a hydrophobic essentially immiscible oragnic phase, with the formation of a minimum of unwanted by-products. A process for the manufacture of N,N-bis(2-chloroethyl)-2,6-dinitro-p-toluidine starting with p-toluidine as raw material and including the orthodinitration of N,N-bis(2-chloroethyl)-p-toluidine. The N,N-dihaloalkyl-dinitro compounds made by the instant process are selective herbicides effective for weed control in crops of cotton, annual legumes and related plants.

3 Claims, No Drawings

PROCESS FOR THE MANUFACTURE OF N,N-DICHLOROALKYL-2,6-DINITRO-4-ALKYL ANILINE

BACKGROUND OF THE INVENTION

The economics of the manufacture of a bulk chemical, no matter how sophisticated or complicated it might be, determines the degree of success the manufacturer will meet in the marketplace. Stated differently, one might say manufacturing economics require that even a complicated chemical be manufactured from a relatively cheap raw material, using a minimum number of relatively inexpensive steps, forming a minimum quantity of undesirable by-products and wasting as little as possible. Particularly where the manufacture of the desired end product necessitates a number of steps, with a wide selection of materials predicative of varying degrees of efficacy which may be further modified by a judicious choice of process conditions, the particular selection of a sequence of steps may be far from obvious. Theoretical appraisals of possible reactions are of little avail. Duplication of experiments outlined in references, and bench scale experimentation with reactions, both familiar and unfamiliar, are necessary concomitants of a careful evaluation of experimental data essential to the choice of a successful manufacturing process. Faced with outlining a profitable commercial synthesis, one skilled in the art is most unlikely perfunctorily to choose classical reactions solely on the basis of their textbook efficacy. Instead, each step is carefully analyzed, evaluated several times in experimental runs, and again reevaluated for full scale production. In the instant process, it is apparent that choice of a raw material poses several alternatives.

For example, ortho-dinitrated parachlorotoluene might be reacted with diethanolamine to form the N,N-bis(2-hydroxy ethyl)-ortho-dinitrated p-toluidine which may subsequently be halogenated, represented by the reactions as follow:

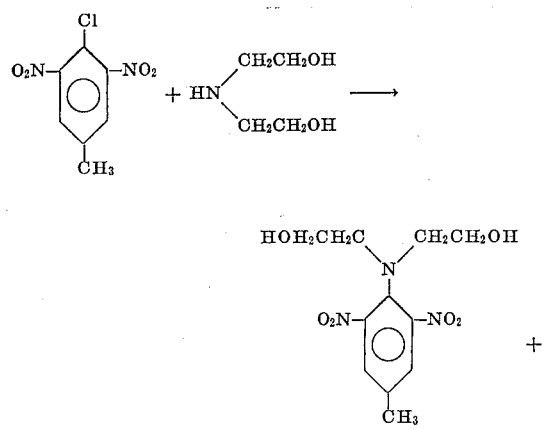

then

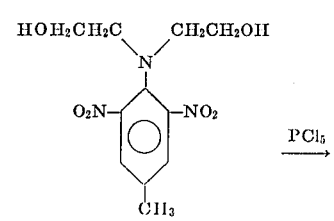

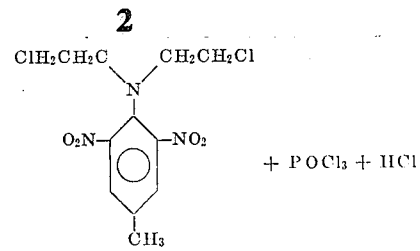

Still another route contemplates the formation of orthodinitrated p-toluidine which might then be hydroxyethylated and subsequently chlorinated to form the dichloroethyl-substituted compound, as follows:

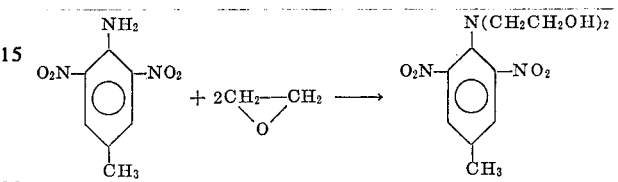

then chlorinate as before.

Yet another third route is to start with p-toluidine which might then be mononitrated then hydroxyethylated, dinitrated in the ortho positions, and halogenated. There are at least four distinct steps and three intermediate products.

The first scheme is eminently workable but not notably economical. The second and third schemes involve a plurality of steps not notably efficient by themselves, and more discouraging, marginally operable if they were operable at all. It became necessary to devise a sequence of steps within the overall scheme outlined in the third method, so that the efficiency, selectivity and yields of the process were more competitive than those made by the preceding processes. The instant invention does so.

Upon examination it will be apparent that there are several sequences of operation embodied in the third process. There are at least six different routes which one skilled in the art might pick. Mononitration and dinitration have been deliberately distinguished since mononitration may yield a mononitrated product in the wrong position, along with that in the desired ortho position, requiring separation of the products. Even if only the mononitrated product in the ortho position were the sole product, separation of the mononitrated product might be essential prior to further nitration to yield the ortho-dinitrated product. Again, dinitration may not yield the ortho-dinitrated product, or might yield other dinitrated products along with the desired orthodinitrated product and other polynitrated products, requiring numerous intermediate separations.

One might list at least six superficially feasible sequences of operation thus:

| (1) | (2) | (3) |
|---|---|---|
| Mononitration | Mononitration | Mononitration |
| Hydroxyalkylation | Dinitration | Hydroxyalkylation |
| Dinitration | Hydroxyalkylation | Halogenation |
| Halogenation | Halogenation | Dinitration |

| (4) | (5) | (6) |
|---|---|---|
| Hydroxyalkylation | Hydroxyalkylation | Hydroxyalkylation |
| Mononitration | Mononitration | Halogenation |
| Dinitration | Halogenation | Mononitration |
| Halogenation | Dinitration | Dinitration |

The sequences of these reactions may be set forth more graphically as follows:

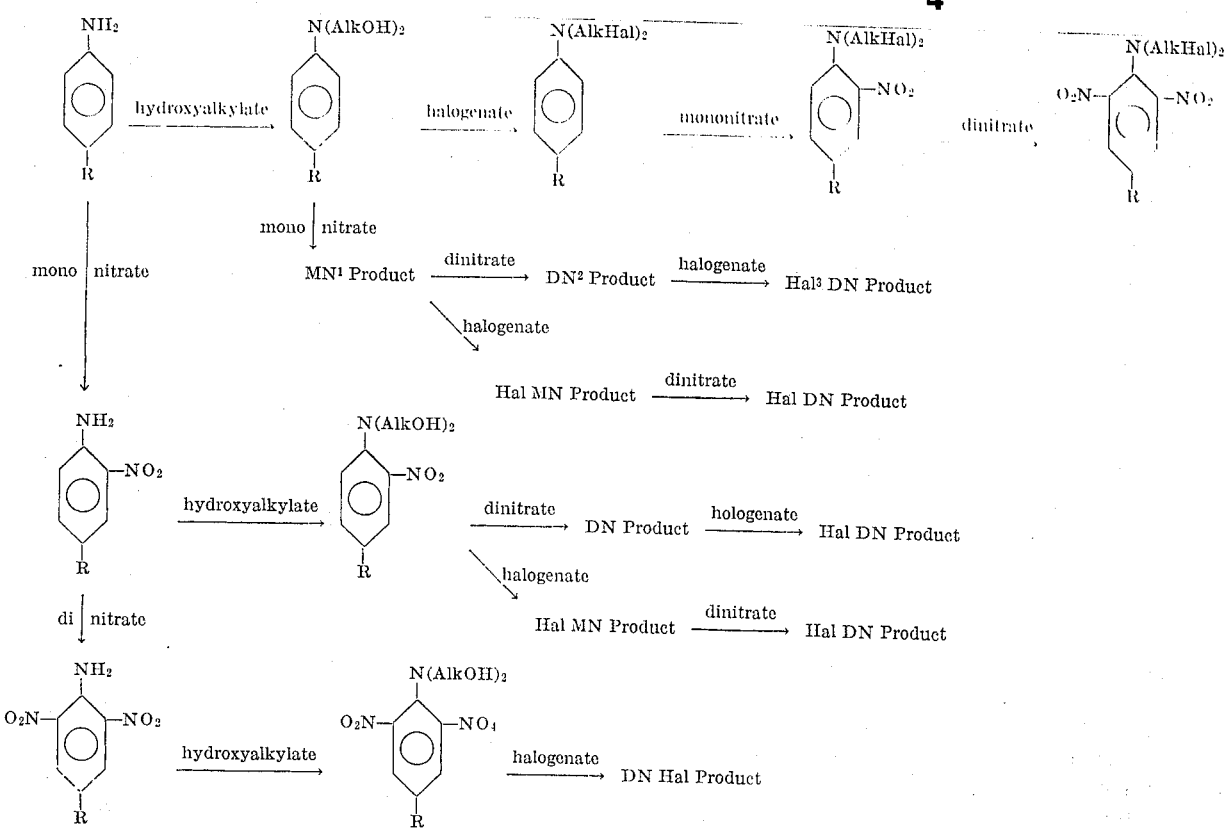

¹MN=mononitrated. ²DN=dinitrated. ³Hal=halogenated.

Curiously enough, only the series in the last column, represented in the reactions at the top of the page, and across it, is operable. Unexpectedly, various combinations become inoperable for one reason or the other. It is impossible to foretell which ones would be operable and which ones would not be operable. For example, though p-toluidine may be successfully mononitrated, it cannot be then N,N-di(2-hydroxyalkylated). Though the mononitrated p-toluidine can successfully be nitrated, it cannot be then hydroxyalkylated. Though p-toluidine can be hydroxyalkylated, it cannot be then mononitrated successfully. It is unnecessary to state that, having arrived at an inoperable reaction, or one that is inoperable for all practical purposes, since the amount, quality, or separability of the product is such that it is of no economic value, any further steps in the process have little meaning. Other combinations of the steps to be added to the list outlined above are mathematically possible, but a skilled chemist would discard them out of hand, and therefore such combinations are not seriously considered and have not been listed.

The applicants readily concede that in the successful series of steps set forth in Column 6, the steps of hydroxyalkylation, and halogenation, are old. It is the combination of these old steps in conjunction with particular nitration steps disclosed by the applicants that is considered to be novel, competitively useful and quite unobvious. Particular attention is focused on the nitration reactions which enable the di(2-chloroalkylated) material to be mononitrated and then dinitrated without the formation of any appreciable quantity of unwanted mononitro or polynitro by-products, at the same time permitting the process to be carried out with high selectivity and very high yields.

Practically all known nitrating agents such as concentrated nitric acid, mixed acids, for example nitric acid admixed with a dehydrating acid such as oleum, sulfuric acid, acetic anhydride, acetic acid, phosphorus pentoxide, alkylene nitrates in the presence of sulfuric acid, organic nitrates such as acetyl and benzyl nitrates, metal nitrates with acetic acid, nitrosulfonic acid, nitrogen tetroxide and the like, have been used in the preparation of nitro-aromatic compounds. Economic considerations are generally determinants in the choice of the agent. Often, however, certain inherent chemical or physical properties, or the presence of substituents, necessitate the use of specific nitrating agents. The choice of the nitrating agent and the conditions of reaction may furthermore determine the position of the entering nitro group. As a rule, the orientation of entering nitro groups in aromatic compounds is determined by the position of groups already present. Generally, the nitro group enters a position meta to a nitro, sulfonic acid, carboxyl, or carbonyl group; and ortho and para to a chloro, bromo, alkyl, amino, or hydroxyl group. Further, a lower temperature of nitration is conducive to the exclusive formation of the meta derivatives in the first group, and a preponderance of para compound in the second. In case two or more groups are already present, it is difficult to preduct which compound will be formed owing to the conflicting influences of these groups, and often a mixture of different compounds will result upon nitration. ("Unit Processes in Organic Synthesis", by P. H. Groggins, page 8, McGraw Hill Book Co., Inc., New York, 1938.) Since amino compounds are very susceptible to oxidation, it is generally necessary to protect the NH₂ group during nitration, usually by converting the amine to its acyl derivative.

Sometimes it is possible to nitrate amino compounds without resorting to previous acylation but the product obtained is likely to differ from that obtained by the nitration of the acyl derivative. For example, when p-toluidine is dissolved in a large quantity of sulfuric acid and nitrated with mixed acid ($HNO_3$-$H_2SO_4$ mixture) at low temperatures, 3-nitro-p-toluidine is obtained. The nitration of the acetyl derivative yields 2-nitro-p-toluidine (Groggins, Page 10, current numbering.)

Surprisingly, it has been found that N,N-di(2-haloalkyl) amine, p-phenyl substituted compounds which are tertiary aromatic amines, can be directly nitrated to form first the mono-nitro and then the dinitro product in a single operation under controlled reaction conditions despite the fact that, in addition to the obstacles set forth hereinabove, the dialkyl substitutions offer strong steric hindrance to the dinitration of the phenyl ring in positions ortho to the nitrogen atom. Similarly, the ortho-mono-nitrated N,N-di(2-haloalkyl), p-phenyl substituted compound can be directly ortho-dinitrated. It has also been found that, unexpectedly, the instant ortho-dinitration proceeds with high selectivity and yields, provided the reaction is carried out in the presence of a second liquid phase comprising an organic liquid essentially immiscible in the aqueous phase. Such an organic liquid is preferably a hydrophobic solvent in which the N,N-di(2-haloalkyl) precursor is relatively less soluble than in the aqueous phase but in which the dinitro N,N-di(2-haloalkyl) product is relatively more soluble. When the instant reaction is carried out in a multiphase system of aqueous and organic solvents to which are attributable the hereinbefore mentioned solubility characteristics, the dinitro product is incorporated into the organic liquid phase substantially as quickly as it is formed, thus decreasing the concentration of product molecules in the immediate vicinity of the reactants and permitting surprisingly high yields with correspondingly fast reaction rates.

The ortho-dinitrated tertiary aromatic amines manufactured by the instant process are highly selective herbicides. In particular, N,N-bis(2-chloroethyl)-2,6-dinitro-p-toluidine is extremely effective for the control of weeds in fields of cash crops such as those of the genus *Gossypium* and particularly cotton, and of annual legumes, particularly soy bean, and plants that are closely related botanically thereto. It may be conveniently admixed with a number of conventional, substantially inert diluents or carrier materials such as talc, oils, clays, and the like, and is preferably used in admixture with the foregoing carriers at concentrations in the range from 0.5 to 5 pounds of N,N-bis(2-chloroethyl)-2,6-dinitro-p-toluidine per acre, though up to 20 lbs. per acre may be used, under certain conditions, without injuring the cash crop.

The nitration of organic compounds is one of the most important unit processes and plays an important part in the manufacture of explosives, the dyestuff industry, pharmaceuticals, and biologically toxic compounds. Water is a product of the reaction of the nitration processes, and unless this water is removed, the reaction approaches an equilibrium before completion. Many attempts have been made to remove this water by chemical combination and thus to prevent an equilibrium being produced, so that the reaction will be continued. The most successful of such attempts, and the one commonly in use, is to provide concentrated sulfuric acid in the zone of the reaction to absorb the water produced. The sulfuric acid is mixed with nitric acid in certain definite proportions, depending upon the particular materials used and this mixture of nitric and sulfuric acids is referred to in the art as "mixed nitrating acid". For mononitration the proportion of nitric in the mixed acid generally does not exceed 33 percent. For higher nitration the proportion of nitric acid becomes smaller and smaller and may be as low as 3 to 5 percent with consequent increases in the amount of sulfuric acid. The increased proportion of sulfuric acid is necessary to combine with the larger amount of water involved during these particular reactions. Thus, the mixed acid requires a certain distribution of the two acids depending upon the particular nitration reaction involved before it can be used for that reaction.

The instant reaction is a nitration reaction which utilizes nitric acid and no sulfuric acid. In particular, it makes no effort to absorb or otherwise tie up the water formed during the reaction. Yet it is an extremely successful reaction.

The nitration step of the instant process contemplates a reaction which may be generally represented as follows:

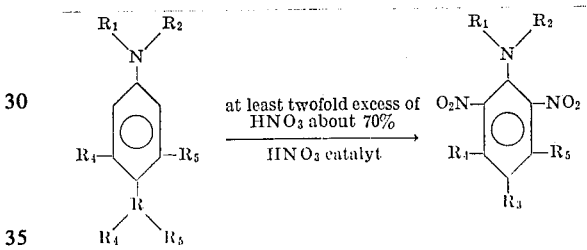

wherein $R_1$ and $R_2$ are independently selected from 2-haloalkyl having from 2 to 4 carbon atoms; $R_3$ is selected from alkyl having from 1 to 4 carbon atoms, aryl, aralkyl, alkoxy, hologen and haloalkyl having from 1 to 4 carbon atoms; $R_4$ and $R_5$ are independently selected from the group consisting of hydrogen, alkyl having from 1 to 4 carbon atoms, haloalkyl having from 1 to 4 carbon atoms, and halogen.

More particularly, it has been discovered that N,N-di(2-haloalkyl)-p-toluidine can be effectively ortho-dinitrated in acid medium. The aqueous acid medium may be concentrated nitric acid alone, or concentrated nitric acid diluted with a carboxylic acid or acid anhydride soluble in nitric acid but stable and unreactive with said nitric, such as acetic acid, propionic acid, trichloroacetic or trifluoroacetic acid. The instant ortho-dinitration may be also carried out using concentrated nitric acid alone, mixed with a hydrophobic essentially water-immiscible solvent unreactive with concentrated nitric acid under the conditions of reaction. Irrespective of the reaction medium, the reaction requires the presence of a catalytic quantity of nitrous acid or derivative thereof, and is thought to proceed according to the following reaction:

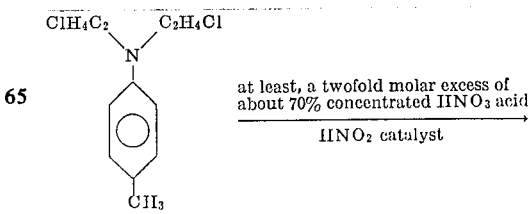

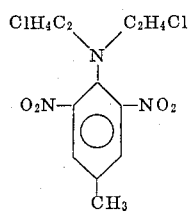

The nitration reactions embodied in the instant process are again unexpected in light of the authoritative discussion and study of the kinetics and mechanism of aromatic nitration set forth in Part VII "Products of Nitration of Aniline Derivatives, Especially of Dimethylaniline. The Concomitant Dealkylation of the Dialkylanilines." by Glazer, Hughes et al. in J. Chem. Soc., 1950, pages 2657 – 2678, wherein the authors discuss in detail various derivatives obtained upon nitration and conclude that "the nuclear nitration of derivatives of aniline by means of nitric acid takes place by two mechanisms, one which can proceed in the absence of nitrous acid, whilst the other is dependent upon nitrous acid; that these two mechanisms often operate simultaneously; and that side reactions may occur, some of which are oxidative, producing nitrous acid which influences both nitration mechanisms, especially the second; and that with tertiary alkylated anilines, dealkylation is a frequent concomitant of nitration." One skilled in the art would have no reason to believe that a substituted dihaloalkyl derivative would behave more stably than the methyl derivatives of aniline, particularly dimethylaniline. In other words, many competing reactions could be expected to occur which, for some reason not clearly known at this time, do not.

U.S. Pat. No. 2,739,174 entitled "Nitrating Aromatic Hydrocarbons with only Nitric Acid" teaches that "When nitric acid is reacted with a nitratable compound, the products of reaction are the nitro compound and water. Unless water is removed from the zone of reaction, the nitration soon stops." (Column 1, Lines 27 – 31.) In the instant invention the water is not removed from the zone of reaction, yet the nitration does not stop. Neither does the reaction stop at the mononitro compound, but it progresses to further nitrate the mononitro compound to form the ortho-dinitro compound.

The nitration reaction of the instant process may be carried out in the presence of glacial acetic acid or acetic anhydride, propionic, trichloroacetic, or trifluoroacetic acids. Though the use of nitric acid alone or in conjunction with acetic acid or acetic anhydride is well known in nitration reactions, the effectiveness of nitration with nitric acid alone or in the presence of acetic acid is not predictable. For example, in U. S. Pat. No. 3,086,062 it is disclosed that "1,3,5-triisopropylbenzene can be converted with 96 percent nitric acid at 30° C. in the presence of acetic acid and acetic acid anhydride into 2-nitro-1,3,5-triiso-propyl-benzene. It is not possible, however, to introduce a second nitro group, even if the quantity of the nitric acid is raised from 1/2 to 4 equivalents, the temperature from 30° to 70°C., and the reaction time to 20 hours." (Column 1, Lines 37 – 40.)

It is known that nitrous acid nitrates dimethyl-p-toluidine giving at least 80 percent of 2-nitro-dimethyl-p-toluidine (2-nitro-1-dimethyl amino-4-methyl-benzene) through nitric acid at the same dilution is practically inactive. ("Nitrous Acid as a Nitrating Agent. Part I. Nitration of Dimethyl-p-toluidine." J. Chem. Soc., 1930, pages 277 – 291.) The same reference proceeds to state that since 3-nitro-dimethyl-p-toluidine is produced by the normal nitration process, the mechanism of the above reaction must differ from that of "ordinary" nitration. In other words, assuming that the dihaloalkyl side chains would stay intact being no more susceptible to attack than the dimethyl groups, then "ordinary" nitration would be expected to yield the meta-mononitro-substituted product, rather than the ortho-mononitro-substituted p-toluidine. Viewed conventionally, the instant process embodies an "ordinary" nitration, except for the fact that it requires an effective amount of nitrous acid or derivative thereof capable of generating nitrite ions in aqueous acid, as a catalyst at a relatively low temperature, yet it produces the ortho-dinitrated p-toluidine.

The effectiveness of nitrous acid as a catalyst, or a compound which in the reaction mixture gives rise to nitrous acid, or nitrite ions, is again surprising since it is known that nitrous acid preferentially gives nitrosated compounds and in particular gives nitrosated amines. For example, U.S. Pat. No. 3,062,887 teaches that the use of nitrous acid will form a nitrosated secondary amine. It would not be unreasonable to assume that a similar reaction with a tertiary amine would yield predominantly a ringnitrosated tertiary amine. But it does not. This is particularly unexpected since the conditions under which the nitration reaction of the instant invention are carried are more or less similar to those under which secondary amines are nitrosated.

The effectiveness of nitrous acid and derivatives thereof as a catalyst is also surprising since it is known that in many "ordinary" nitration reactions, particularly those of substituted aromatic compounds where a zeroth-order reaction proceeds with nitric acid in large excess giving rise to the slow production of nitronium ion from nitric acid, nitrous acid acts as an anticatalyst. For example, in the chapter on nitration in "Rates and Mechanisms of Reactions, Part I" (Technique of Organic Chemistry, Vol. VIII, Inter Science Publishers, Inc., New York, 1961), a discussion on nitration with the nitronium ion includes the statement:

"The nitration of the aromatic was shown to occur via nitronium ion production in a slow step which in nitromethane was made more rapid than the formation of nitronium ions. Due to the absence of isotope effects the completing step in the mechanisms of nitration are presented as follows:

$$NO_2^+ + ArH \longrightarrow O_2N-Ar^+-H$$

$$O_2N-Ar^+H \longrightarrow O_2NAr + H^+$$

"Throughout the studies the amount of nitrous acid, which exists mainly as dinitrogentetroxide in nitric acid, present in the solution was carefully controlled. The negligibility of its effect was established since it is a powerful anticatalyst. Its influence on the reaction rate was attributed to the nitrate ion formed in the equilibrium, $N_2O_4 \rightleftarrows NO_3^- + NO^+$" (page 556).

Organic compounds have been nitrated in the prior art in combination with a diluent which is substantially inert to the reacting materials, is substantially immiscible with water, has a suitable boiling point, and is preferably a solvent of the compound to be nitrated as well as the product of nitration, where the temperature of the mixture is adjusted until the mixture begins to boil so as to remove water from the zone of reaction without the necessity of using an absorption acid, such as sulfuric acid (U. S. Pat. No. 2,435,314). Other references disclose reactions in which an organic phase is used in ordinary mixed acid nitration reactions to control the reaction and to give better yields. (U. S. Patent No. 3,086,062.) The method of the instant invention does not remove the water formed, yet, because of the partition characteristics of the precursor dihaloalkyl 4-substituted tertiary aromatic amine and the ortho-dinitrated product in the aqueous and organic phases, the detrimental effect of water is negated, at the same time permitting the process to be carried out at temperatures lower than that necessary for removal of water by azeotropic distillation. Generally the reaction of the present invention are carried out the range of from −20°C. to 150°C

SUMMARY OF THE INVENTION

It has been discovered that the 4-substituted aniline can be efficiently hydroxyalkylated, then halogenated prior to nitration, and that this sequence of process steps is a necessary and critical concomitant to the success of the overall synthesis from the starting raw material to the desired ortho-dinitrated N,N-bis(2-haloalkyl)-4-substituted aniline.

Further, it has been found that a di(2-halo) alkylsubstituted tertiary aromatic amine may be directly ortho-dinitrated with at least a twofold molar excess over theoretical of concentrated aqueous nitric acid present at the beginning of the reaction in the range from about 50 to 90 percent nitric acid, in sufficient quantity so as to leave at least a 50 percent aqueous acid near the completion of the reaction, in the presence of an effective quantity of a catalyst selected from nitrous acid, or a derivative thereof capable of generating nitrite ions in aqueous acid. The nitration may also be carried out with concentrated nitric acid in the range specified in acetic acid solution, and similarly catalyzed. The nitration may also be carried out with concentrated nitric acid in the range specified, and similarly catalyzed, in the presence of a hydrophobic organic solvent essentially immiscible in aqueous acid solution, and essentially inert to concentrated nitric acid under the conditions of reaction. When the nitration is carried out in aqueous concentrated nitric acid, or in concentrated nitric acid diluted with a carboxylic acid which is soluble in aqueous acid but stable to concentrated nitric acid under the conditions of reaction, the reaction may be said to proceed in homogeneous phase. When the nitration reaction is carried out in the presence of an essentially immiscible organic liquid phase, the reaction may be set to proceed in a multiphase medium. Whether or not the nitration is carried out in homogeneous or multiphase medium, the dihaloalkyl-substituted-tertiary aromatic amine may be converted to the ortho-dinitrated compound with the formation of a minimum of unwanted by-products, at relatively low temperatures, with selectivities in excess of 75 percent and with high yields. Water formed during the reaction is not immediately removed, and appears not to influence the rate or the selectivity of the reaction adversely.

DESCRIPTION OF PREFERRED EMBODIMENT OF THE INVENTION

In a specific and preferred embodiment of the instant process in which raw material p-toluidine is converted to N,N-bis-(2-haloalkyl)-2,6-dinitro-p-toluidine, the first step of hydroxy-alkylation is carried out in the presence of about 4 normal acetic acid using liquid ethylene oxide or propylene oxide. The temperature is maintained in the range from about −10° to 30°C. and the exotherm is carefully monitored while continuous agitation permits the reaction to proceed to completion. The hydroxyalkylated product is recovered by extraction with a suitable solvent such as chloroform. The next step of halogenation is effected by reacting the hydroxyalkylated product in the solvent with a halogenating agent such as a chlorinating agent selected from phosphorus pentachloride, phosphorus oxychloride, or thionyl chloride to form the dichloroalkyl-substituted p-toluidine. The reaction is started at about ambient temperature then slowly heated to reflux before the reaction is adjudged complete. The halogenated product may be recovered from the solvent by any conventional means such as distillation. Ortho-dinitration of the N,N-bis(2-haloalkyl)-p-toluidine is preferably carried out in a jacketed pressure vessel equipped with internal heat exchange means and variable adjustable mixing means, using concentrated nitric acid only. Though the reaction may also be carried out continously, batch-wise reaction in a kettle gives exceedingly good results with a high degree of control and reproducibility.

At least a twofold excess over theoretically required nitric acid, and preferably about a tenfold excess of nitric acid in the range from 50 percent to about 90 percent concentration, is used in the instant homogeneous or multiphase reaction mixture, with 70 percent nitric acid being most preferred. Excess nitric acid greater than tenfold is operable but generally unnecessary. Enough acid is used at the beginning of the reaction to ensure that the concentration of acid in the reaction mass at the end of the reaction is at least 50 percent. Solid sodium nitrite is added to the acid mixture to generate nitrous acid, though any other means for introducing nitrous acid, or a derivative thereof capable of producing nitrite ions, would be satisfactory. The amount of nitrous acid used may be in the range from about 0.001 to 10 percent by weight of the reaction mixture though about 0.1 to 0.5 percent is most preferred.

In one specific embodiment of the instant ortho-dinitra-tion reaction, solid N,N-bis(2-chloroethyl)-p-toluidine is added to 70 percent nitric acid in the presence of nitrous acid catalyst while constantly stirring. The reaction product is the ortho-dinitrated N,N-bis(2-chloroethyl)-p-toluidine.

In another specific embodiment of the instant invention, N,N-bis(2-haloalkyl)-p-toluidine is slowly added to concentrated nitric acid mixed with glacial acetic acid. The temperature of the contents of the reactor is maintained below about 20°C. during addition of the tertiary aromatic amine while constantly stirring. Thereafter the temperature may be gradually increased to about 60°C. and the temperature maintained until substantially all of the N,N-bis(2-haloalkyl)-p-toluidine is exhausted. The reaction mixture is then quenched in melting ice. Neutralization with an alkaline water soluble salt, preferably sodium hydrogen carbonate, is optional. The mixture is extracted with a haloaliphatic, such as chloroform, or an aromatic solvent, such as benzene, toluene, or xylene. The aromatic solvent is dried by any conventional means, preferably over a bed of MgSO₄, and the dried solvent is stripped off to yield predominantly the desired N,N-bis(2-halo-alkyl)-2,6-dinitro-p-toluidine. As has been stated hereinbefore, the instant nitration reactions may be carried out without any carboxylic acid or acid anhydride; in practice, because of the attendant separation problems where acetic acid, for example, is used, the dinitration step is preferably carried without such an acid. It might also be stated that very small quantities of concentrated sulfuric acid are tolerated by the instant nitration reaction, but any significant quantity of sulfuric acid, that is, any amount capable of absorbing a significant portion of the water formed during reaction, is detrimental.

When the instant ortho-dinitration is carried out in a multiphase reaction mixture, the ratio of the aqueous phase to the hydrophobic organic phase is not critical if there is sufficient liquid in each phase to permit adequate interfacial contact area for transfer of the nitrated product from the reaction zone into the organic solvent phase, and enough organic solvent to dissolve the nitrated product.

A wide variety of organic liquids have properties suitable for use as the hydrophobic organic phase. In general, these liquids should be nonviscous, relatively inert to the reactants and reaction products under the reaction conditions, substantially immiscible with the aqueous phase, and have relatively high solubility for the nitrated product. Relatively low solubility for the dihaloalkyl-substituted tertiary aromatic amine precursor is also desirable. These requirements are met by numerous organic compounds including halogenated aliphatic hydrocarbons having from 1 to 9 carbon atoms, preferably chloroform and carbon tetrachloride, and mononuclear aromatic hydrocarbons including benzene, xylenes, toluene, and nitro- and halo- derivatives thereof.

The instant process comprises reacting a dihaloalkyl-4-substituted tertiary aromatic amine with at least a twofold molar excess of concentrated nitric acid present at the beginning of the reaction in the range from about 50 to 90 percent nitric acid in sufficient quantity so as to leave at least a 50 percent aqueous acid near the completion of the reaction, intimately mixed with a hydrophobic organic solvent, in the presence of a catalytic quantity of nitrous acid, or a derivative thereof capable of generating nitrite ions in aqueous acid, to produce predominantly a partially water-soluble, organic solvent-partitionable ortho-dinitro-dihaloalkyl-4-substituted tertiary aromatic amine.

The partitioning of a compound between two solvent phases is conveniently expressed as a distribution ratio or partition coefficient which, for the purposes of this disclosure, may be defined as:

(Percent soluble in the aqueous phase/Percent soluble in the organic phase) = K wherein K is the distribution or partition coefficient. The partition coefficient for the precursor dihaloalkyl 4-substituted amine may be defined more accurately as:

(Percent halogen[1] dissolved in the aqueous phase/Percent halogen dissolved in the organic phase) = $K_{Hal}$ Similarly the partition coefficient for the product dihaloalkyl-ortho-dinitro-4-substituted amine may be defined more accurately as:

(Percent NO₂[1] dissolved in the aqueous phase/Percent NO₂ dissolved in the organic phase) = $K_{NO_2}$ and the partition coefficient for an alkyl-substituted tertiary aromatic amine may be defined more accurately as:

(Percent alkyl[1] dissolved in the aqueous phase/Percent alkyl dissolved in the organic phase) = $K_{Alk}$

[1] unless otherwise indicated, all "percent" notations are percent by weight of the solvent in which the compound is dissolvable.

The precursor dihaloalkyl-4-substituted amines have partition coefficients $K_{Hal}$ in the range from about 10:1 to about 1000:1, indicating they are much more soluble in the aqueous phase than they are in the organic phase. The product ortho-dinitrated-4-substituted amines, on the other hand, are much more soluble in the organic phase than they are in the aqueous phase, and have partition coefficients $K_{NO_2}$ in the range from about 0.001:1 to about 0.1:1.

Particularly with regard to the manufacture from N,N-bis-(2-chloroethyl)-p-toluidine, a fivefold excess over theoretical of about 70 percent concentrated nitric is mixed with about an equal volume of a benzene, toluene, or xylene solution of substrate at a temperature below about 20°C. The temperature of the contents of the reactor is maintained below about 20°C. during addition of the dihaloalkyl-4-substituted amine while constantly stirring. The organic solvent phase is thereafter separated from the aqueous phase. This is conveniently accomplished by allowing the quiescent fluid mixture to stratify, then separating the organic solvent containing the desired product. The multiphase reaction mixture may be separated by centrifuging, distillation, liquid extraction, or other known means. The product may be recovered from the organic solvent phase by evaporation of the solvent, or by crystallization, distillation, or by reextraction with another organic solvent in which the product is substantially more soluble and from which it may in turn be recovered by crystallization or distillation. It may be convenient to neutralize the organic solvent phase with an aqueous solution of an alkaline, water-soluble salt followed by separation of the aqueous and organic phases. Again, the entire reaction mixture may be neutralized prior to separation of the phases if only a slight excess of concentrated nitric acid is used; it will be apparent that the economics of neutralizing large excesses of reusable nitric acid would not be inviting.

As in the homogeneous phase reaction, small quantities of concentrated sulfuric acid are tolerated by the instant multiphase nitration reaction, but any significant quantity of sulfuric acid, that is, any amount capable of absorbing an appreciable portion of the water formed during reaction, is detrimental. Similarly, in multiphase reaction, very small quantities of a carboxylic acid or acid anhydride are tolerable but undesirable.

In the following examples all parts are parts by weight unless otherwise stated. All references to percent concentrated nitric acid, or other acids, define the weight concentration of acid in aqueous solution, for example 70 percent concentrated acid implies 30 percent by weight water is present.

Example 1

288 grams of p-toluidine and 150 ml. of 4 N aqueous acetic acid are thoroughly mixed and cooled to about 5°C. 220 grams of liquified ethylene oxide is added to the mixture with constant stirring, while the temperature is maintained at about 5°C. The temperature is subsequently permitted to rise to ambient temperature whereupon a further quantity of about 250 ml. of liquified ethylene oxide is added(with cooling), again with constant stirring. After the reaction is complete, the reaction mixture is neutralized with an aqueous sodium carbonate solution and is extracted with chloroform. The reaction product, identified as N,N-bis(2-hydroxyethyl)-p-toluidine, is obtained in substantially quantitative yields, and is extracted into the chloroform phase. The chloroform layer containing the dihydroxyethyl compound is reacted with a slight excess of phosphorus pentachloride, which is added incrementally while constantly stirring. The temperature is raised to about 50°C. and refluxed until halogenation of the hydroxy groups is complete. The reaction mixture is drowned in ice water to destroy remnants of the chlorinating agent. The layers of chloroform and water are then separated and the chloroform layers washed until neutral. Upon azeotropic distillation of the chloroform layer, N,N-bis(2-chloroethyl)-p-toluidine is obtained in about 80 percent yield.

18 ml. of 70 percent $HNO_3$ are placed in a reaction vessel containing 34 ml. of acetic acid and 0.5 g. of sodium nitrite is added to the acid. The temperature of the acid is maintained at 20°C. and while it is stirred, 10 g. of N,N-bis(2-chloroethyl)-p-toluidine are added to the acid incrementally. The reaction mixture is slowly heated to about 60°C. and maintained at the temperature until the ortho-dinitration of the compound is complete. The reaction mixture is then quenched in ice water and neutralized with a small amount of alkali. The reaction mixture is then extracted with a solvent, such as haloaliphatic, or an aromatic solvent and the solvent layer is dried by any conventional means, such as over solid magnesium sulfate. The product recovered is substantially N,N-bis(2-chloroethyl)-2,6-dinitro-p-toluidine.

Similar reactions were carried out with a raw material in which the methyl group of p-toluidine was replaced by a phenyl group. Again, similar reactions were carried out with a raw material in which the p-toluidine was chloropropylated. In each case the corresponding ortho-dinitrated product is obtained.

Example 2

To a solution of 32.4 ml. of 70 percent nitric acid at 5°C. is added 0.1 g. of sodium nitrite and 10 g. of solid N,N-bis(2-chloroethyl-p-toluidine while constantly stirring. The temperature is maintained between 5° and 7°C. and stirring is continued until a solid product starts to separate out from the solution. When it is determined that the formation of solid product is complete, the reaction mixture is quenched in 200 ml. of water and the solid product filtered, washed with water and dried. Additional product may be recovered from the aqueous phase by extraction with an aromatic solvent, such as benzene. Recovery of the solid product having a melting point of 55° to 60°C. was 10.8 g. The solid product was identified as N,N-bis(2-chloroethyl)-2,6-dinitro-p-toluidine and assayed approximately 78 percent of the filtered product. The actual yield for the run is thus about 60.6 percent of theory.

In the production of the dinitro compound described in the examples hereinabove, at least 2 mols of nitric acid per mol of haloalkylated 4-substituted tertiary aromatic amine must be used. It is preferred that an excess of concentrated nitric acid be employed, which may range as high as a tenfold excess. In general about a twofold excess will suffice, the upper limit of the excess used will be predicated upon economic considerations and the requirement that the concentration of aqueous acid near the completion of the reaction should be at least 50 percent. It is desirable that the quantity of nitrous acid or nitrite ions generated in aqueous acid be limited to that quantity necessary to give an acceptable reaction rate with minimum formation of unwanted by-products which tends to increase with increase of nitrite ions. It is preferred that the concentration of nitrous acid or nitrite ions formed in the reaction mass be less than 5 percent by weight of the acid present.

Example 3

A mixture of 32.4 ml. 70 percent $HNO_3$ (0.51 mols), 0.1 gram (0.0014 mol) sodium nitrite, and 20 ml. benzene is stirred at 5°C. while 10 grams (0.043 mol) of N,N-bis(2-chloroethyl)-p-toluidine dispersed in 30 ml. benzene is added slowly to it. Stirring is then continued for 3.5 hours at 5°C. The mixture is poured into 200 ml. water and mixed well, and the layers are then separated. The benzene layer is washed with 200 ml. water, then with 100 ml. 2 percent sodium carbonate, then with 100 ml. of water or until the water is neutral. 150 ml. portions of benzene are now used to wash each of the 5 aqueous washes and each portion is then combined with the benzene layer; all the benzene containing dissolved solid is dried over magnesium sulfate, then stripped to give 12.2 grams (86 percent assay) of the ortho-dinitrated product giving a yield of 75 percent of theory. Unreacted raw material in the aqueous phase may be retained for further use and reacted anew along with fresh raw material. In bench-scale experiments, by-products were recovered only in insignificant quantity.

Example 4

The desired dinitrated product may be prepared from the ortho-mononitrated dihaloalkyl-substituted tertiary aromatic amine as follows:

Stir a mixture of 32.4 ml. 70 percent aqueous nitric acid, 0.1 g $NaNO_2$ and 20 ml. benzene at 0° – 5°C. while adding dropwise 11.9 g. of N,N-bis(2-chloroethyl)-2-nitro-p-toluidine dispersed in 30 ml. benzene. Stir the reaction mixture at 5°C. for 4.33 hours. Separate the layers and wash the benzene with water and alkaline water until neutral. The benzene layer is dried and evaporated as in the previous example to give a yield of ortho-dinitrated product which was 76 percent of theory. Similar results can be obtained with ortho-xylene, meta-xylene, and isopropylbenzene.

Similar reactions can be carried out with a raw material in which the methyl group of p-toluidine is replaced by a phenyl group. Again, similar reactions can be carried out with a raw material in which the p-toluidine is 2-chloropropylated. In each case the corresponding ortho-dinitrated product will be obtained.

What is claimed is:

1. A process for preparing N,N-bis(2-chloroethyl)-2,6-dinitro-4-alkyl aniline from a reactant selected from the group consisting of N,N-bis(2-chloroethyl)-4-alkyl aniline and N,N-bis(2chloroethyl)-o-monitro-4-alkyl aniline, wherein the alkyl group is selected from the group consisting of methyl, ethyl, propyl, and butyl; consisting essentially of the steps of:

a. contacting the reactant with at least a two-fold molar excess over the theoretical amount of aqueous nitric acid, the concentration of such acid being from 50 percent to 90 percent at the beginning of the reaction and at least 50 percent aqueous nitric acid at the completion of the reaction and in the presence of from 0.001 percent to 10 percent by weight of the reaction mixture of nitrous acid, at a temperature of from $-20°C$. to $150°C$. for a period of time sufficient to form N,N-bis(2-chloroethyl)-2,6-dinitro-4-alkyl aniline; and b. recovering N,N-bis(2-chloroethyl)-2,6-dinitro-4-alkyl aniline.

2. A process in accordance with claim 1 wherein the aqueous nitric acid solution is mixed with an acid selected from the group consisting of acetic acid, acetic anhydride, propionic acid, propionic anhydride, trichloroacetic acid, trichloroacetic anhydride, trifluoroacetic acid, and trifluoroacetic anhydride.

3. A process in accordance with claim 1 wherein the preparation is carried out in the presence of an inorganic phase selected from the group consisting of chloroform, carbon tetrachloride, benzene, xylene and toluene.

* * * * *